United States Patent [19]

Kamath et al.

[11] Patent Number: 5,233,445
[45] Date of Patent: Aug. 3, 1993

[54] ACTIVE MATRIX LIQUID CRYSTAL DISPLAY WITH AVERAGE DIELECTRIC CONSTANT GREATER THAN 6 AND LESS THAN 1.8 MEQ/G CYANO GROUPS

[75] Inventors: Hundi P. Kamath, Los Altos; Robert H. Reamey, Palo Alto; Mark F. Wartenberg, San Jose; Stephen S. Moore, Redwood City; Philip J. Jones, Menlo Park, all of Calif.

[73] Assignee: Raychem Corporation, Menlo Park, Calif.

[21] Appl. No.: 806,573

[22] Filed: Dec. 12, 1991

[51] Int. Cl.$^5$ .................. G02F 1/13; C09K 19/52
[52] U.S. Cl. .................. 359/51; 359/52; 359/106; 252/299.01
[58] Field of Search .................. 359/51, 52, 106; 252/299.01

[56] References Cited

U.S. PATENT DOCUMENTS

| 4,673,255 | 6/1987 | West et al. | 359/51 |
| 4,717,244 | 1/1988 | Hilsum et al. | 359/59 |
| 4,878,741 | 11/1989 | Fergason | 359/51 |
| 4,890,902 | 1/1990 | Doane et al. | 359/51 |
| 5,015,057 | 5/1991 | Rumbaugh et al. | 359/51 |
| 5,138,472 | 8/1992 | Jones et al. | 359/51 |
| 5,150,232 | 9/1992 | Gunkima et al. | 359/51 |
| 5,196,952 | 3/1993 | Hirai et al. | 359/51 |

FOREIGN PATENT DOCUMENTS

| 0198168 | 10/1986 | European Pat. Off. |
| 0313053 | 4/1989 | European Pat. Off. |
| 3-98022 | 4/1991 | Japan |
| WO90/03593 | 4/1990 | PCT Int'l Appl. |
| WO91/09092 | 6/1991 | PCT Int'l Appl. |
| WO91/10716 | 7/1991 | PCT Int'l Appl. |
| WO91/05029 | 4/1992 | PCT Int'l Appl. |

OTHER PUBLICATIONS

Chisso Corporation Brochure "LIXON Information" (Sep. 1990).
Finkenzeller et al., "Physical Properties of Liquid Crystals: III Dielectric Permitivities", The Merck Group Liquid Crystal Newsletter, No. 4, (Mar. 1989).
Yaniv et al., "Active Matrix Polymer Dispersed Liquid Crystal Display", Japan Display '89 (1989), pp. 572-575.
Weber et al., "Liquid crystals for active matrix displays", Liquid Crystals, vol. 5, No. 5 (1989), pp. 1381-1388.
Finkenzeller et al., "Physical Properties of Liquid Crystals: IV. Optical Aristrophy" The Merck Group Liquid Crystal Newsletter, No. 5 (Oct. 1989), pp. 1-5.
Plach et al., "Liquid-Crystal Mixtures for Active-Matrix Displays Using New Terminally Fluorinated Compounds", SID '90 Digest (1990), pp. 91-94.
Hirai et al., "Liquid Crystal/Polymer Composite Devices for Active-Matrix Projection Displays", SID '91 Digest (1991), pp. 584-597.
Wu et al., "Angular discrimination of light transmission through polymer-dispersed liquid-crystal films", J. Appl. Phys., vol. 62, No. 9 (1987), pp. 3925-3931.

Primary Examiner—William L. Sikes
Assistant Examiner—Anita Pellman Gross
Attorney, Agent, or Firm—Herbert G. Burkard; Yuan Chao

[57] ABSTRACT

An active matrix liquid crystal display having improved performance properties is made using an encapsulated liquid crystal structure comprising a containment medium having dispersed therein a liquid crystal composition having an average dielectric constant greater than about 6 and other specified characteristics.

30 Claims, 2 Drawing Sheets

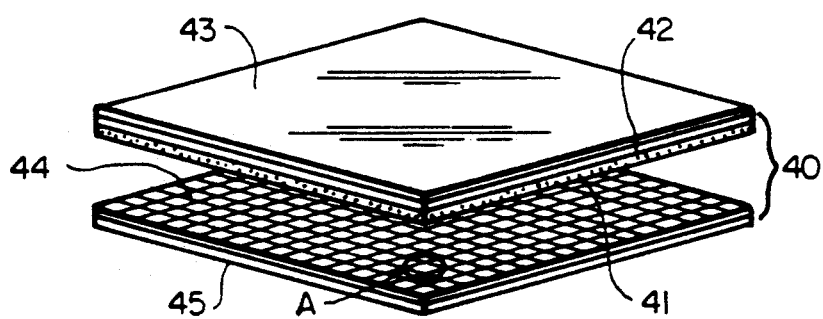
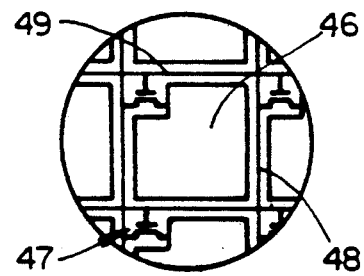
FIG_3
FIG_3a

ACTIVE MATRIX LIQUID CRYSTAL DISPLAY WITH AVERAGE DIELECTRIC CONSTANT GREATER THAN 6 AND LESS THAN 1.8 MEQ/G CYANO GROUPS

TECHNICAL FIELD OF THE INVENTION

This invention relates to active matrix liquid crystal displays and liquid crystal structures for the same.

BACKGROUND OF THE INVENTION

Liquid crystal displays ("LCD's"), in which the electro-optically active element comprises liquid crystalline material, are well known in the art.

Where an LCD is used to depict simple figures or alphanumeric characters, for example numbers via the familiar seven-segment, figure-eight pattern found in calculators and watches, it is feasible to directly address each pixel in the display—that is, to provide each pixel with its own set of electrode leads. But where the display must depict complex images such as graphics or video images, a large number of pixels is required, and it becomes impractical to directly address each one. A display having pixels arranged in M rows and N columns has M×N pixels, thus requiring M×N sets of individual leads for direct addressing. As the pixel density and/or the size of the display increases, this number rapidly becomes unmanageable.

Multiplexing provides a method of addressing each pixel, but with a much lesser number of electrode leads. In its most elementary form, multiplexing uses a set of M row electrodes in combination with a set of N column electrodes. By applying the proper electrical signals to, for example, the 5th row and 8th column electrodes, the pixel at the 5th row and 8th column can be switched on and off. In this way, the number of electrode leads can be reduced from M×N to M+N. However, in this form of multiplexing, adjacent pixels are not independent of each other. When a voltage sufficient to switch the 5th row-8th column pixel is applied, adjacent pixels (e.g., the 4th row-8th column pixel) also experience a substantial voltage and can be inadvertently switched, at least in part, leading to cross-talk between adjacent pixels.

One type of multiplexed LCD is an active matrix LCD, in which each pixel is driven (switched from one visual state to another) by an active switching element such as a thin film transistor ("TFT"), varistor, diode or MIM. The switching element helps eliminate cross-talk and maintain an initially applied voltage across the corresponding pixel, even when it is not being actively addressed, so that the pixel stays "on" while other pixels are addressed. The longer the pixels holds the initially applied voltage, the longer it can be maintained in the "on" state until it is next addressed, permitting the construction of displays having a larger number of pixels. If the matrix contains a sufficiently large number of switching elements of sufficiently small size, high resolution displays are possible. Active matrix displays are important for television, computer, and instrument screens.

One type of liquid crystal display employs an encapsulated liquid crystal structure, in which a liquid crystal composition is encapsulated or dispersed in a containment medium such as a polymer. When a voltage corresponding to a sufficiently strong electric field is applied across the encapsulated liquid crystal structure (the "field-on" condition), the alignment of the liquid crystal molecules therein is re-oriented in accordance with the field, so that incident light is transmitted. Conversely, in the absence of such a voltage (the "field-off" condition) the alignment of the liquid crystal molecules is random and/or influenced by the liquid crystal-matrix interface, so that the structure scatters and/or absorbs incident light. The applied voltage at which the structure changes from its field-off condition to its field-on condition is generally referred to as the threshold voltage.

High quality commercially practical encapsulated liquid crystal active matrix LCD's make rigorous demands of the encapsulated liquid crystal structure and the liquid crystal composition therein. The encapsulated liquid crystal structure must have a high charge holding ratio, both as made and after use under various environmental conditions. The threshold voltage must be low, to be compatible with active matrix capability. Finally, it must have high scattering performance in the field-off condition to provide high contrast ratios.

Many encapsulated liquid crystal structures have been proposed for use in LCD's generally, and some for active matrix displays specifically. A liquid crystal structure which may be suitable for a watch or calculator LCD often will not be suitable for an active matrix LCD. The development of encapsulated liquid crystal materials for active matrix displays has been a difficult proposition.

Some disclosures of liquid crystal compositions asserted to be suitable for encapsulated liquid crystal structures and/or active matrix displays include: Coates, WO 91/09092 (1991); Coates et al., WO 91/05029 (1991); Plach et al., SID 90 Digest, pp. 91–94 (1990); Plach et al., WO 91/10716 (1991); Kunishima et al., JP Kokai 3-98022 (1991); Chisso Corporation product brochure entitled "LIXON Information" (Sep. 15, 1990); Weber et al., Liq. Crystals, Vol. 5, No. 5, pp. 1381–1388 (1989); and Arai et al., EP 0,313,053 (1989).

One of the disclosures (Weber et al.) teaches that a low polarity or average dielectric constant of the liquid crystal is important to attain high resistivity liquid crystal compositions. Specifically taught embodiments have average dielectric constants of 5.8 or less. However, we have found that such liquid crystal compositions lead to displays having unsatisfactory contrast ratios and/or undesirably high threshold voltages.

In other instances, practitioners in the art have used high dielectric constant liquid crystal materials in encapsulated liquid crystal displays. However, such liquid crystal materials comprise substantial amounts of molecules having cyano groups therein, resulting in displays having poor long-term stability.

SUMMARY OF THE INVENTION

We have unexpectedly discovered that, contrary to the teachings in the prior art, an active matrix encapsulated liquid crystal display having superior viewing properties and long-term stability is achieved by using a liquid crystal composition having a relatively high average dielectric constant, a minimal content of cyano groups, and/or other specified characteristics.

Accordingly, this invention provides a liquid crystal display comprising (a) plural pixels comprising an encapsulated liquid crystal structure comprising a containment medium having dispersed therein a liquid crystal composition which contains less than 1.8 meq/g cyano groups and has an average dielectric constant $\epsilon_{avg}$ greater than 6 and (b) a non-linear switching element connected in series with each pixel.

This invention also provides an encapsulated liquid crystal structure comprising a containment medium having dispersed therein a liquid crystal composition which contains less than 1.8 meq/g cyano groups and has an average dielectric constant $\epsilon_{avg}$ greater than 6.

In another aspect, this invention provides a liquid crystal display comprising (a) plural pixels comprising an encapsulated liquid crystal structure comprising a containment medium having dispersed therein a liquid crystal composition which has (i) a threshold voltage $V_{th}$ less than 1.8 volt, (ii) an optical anisotropy $\Delta n$ greater than 0.15, and (iii) an average dielectric constant $\epsilon_{avg}$ greater than 6, and (b) a non-linear switching element connected in series with each pixel.

In yet another aspect, this invention provides an encapsulated liquid crystal structure comprising a containment medium having dispersed therein a liquid crystal composition which has (i) a threshold voltage $V_{th}$ less than 1.8 volt, (ii) an optical anisotropy $\Delta n$ greater than 0.15, and (iii) an average dielectric constant $\epsilon_{avg}$ greater than 6.

BRIEF DESCRIPTION OF THE DRAWING(s)

FIGS. 3 and 3a show an LCD comprising encapsulated liquid crystal structure of this invention.

DESCRIPTION OF THE PREFERRED EMBODIMENTS

Figure 1:
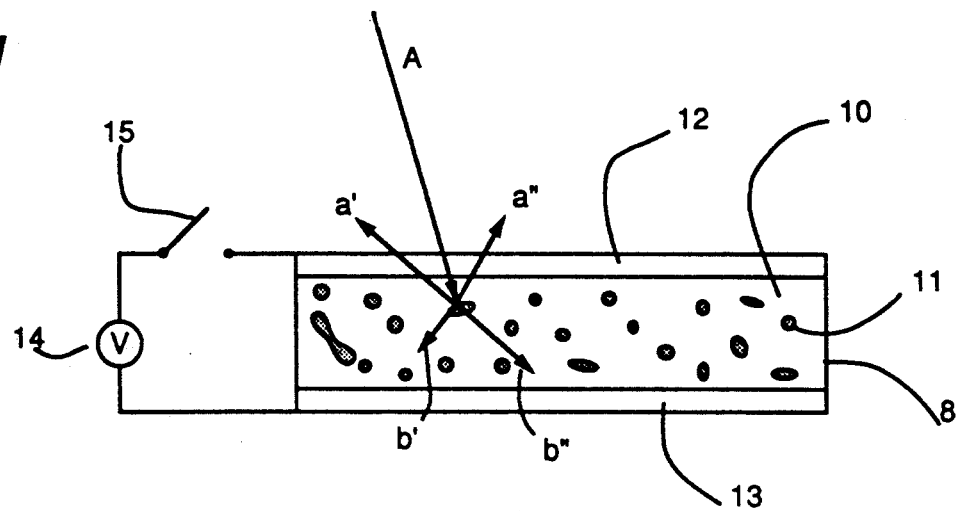
FIGS. 1 and 2 show schematically the operation of an LCD comprising an encapsulated liquid crystal structure.

Encapsulated liquid crystal structures and their preparation are disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987), to West et al.; U.S. Pat. No. 4,688,900 (1987) to Doane et al.; and published European patent application EP 0,313,053 (1989), by Dainippon Ink and Chemicals; the disclosures of each which are incorporated herein by reference. In an encapsulated liquid crystal structure, discrete volumes of a liquid crystal composition are encapsulated, dispersed, embedded or otherwise contained in a containment medium or matrix. The volumes are not necessarily limited to spherical or substantially spherical ones. They may be irregularly shaped, and even interconnected. The amount of interconnection between volumes may be to an extent such that the liquid crystals appear to form a continuous phase, as described in the aforementioned EP 0,313,053. "Liquid crystal composition" denotes a composition having liquid crystalline properties, whether that composition consists of a single discrete liquid crystalline compound, a mixture of different liquid crystalline compounds, or a mixture of liquid crystalline and non-liquid crystalline compounds. Preferably, the liquid crystal composition is nematic or operationally nematic. More preferably, it also has a positive dielectric anisotropy.

Individual liquid crystal molecules typically have elongated shapes, with a tendency to align or orient themselves with their long molecular axes parallel to each other. This alignment causes a liquid crystal composition to be anisotropic, meaning that its measured physical, optical, and other properties are dependent on the direction of measurement (parallel or perpendicular to the direction of alignment). Further, the alignment direction can be influenced by an external stimulus, such as an electrical or magnetic field, causing the liquid crystal composition to exhibit a particular value of a physical characteristic in one direction when the stimulus is absent, but rapidly switching to a different value when the stimulus is applied. It is because of this anisotropy and its ready realignment that liquid crystal compositions are useful as materials for displays.

The containment medium for encapsulated liquid crystal structures is preferably a polymeric material. Suitable containment media include but are not limited to poly(vinyl alcohol) and its copolymers, gelatin, polyurethane, poly(ethylene oxide), poly(vinyl pyrrolidone), cellulosic polymers, natural gums, acrylic and methacrylic polymers and copolymers, epoxies, polyolefins, vinyl polymers, and the like. Poly(vinyl alcohol) is a preferred containment medium.

An encapsulated liquid crystal structure can be formed by deposition from an emulsion containing both the containment medium and the liquid crystal composition or by the evaporation of liquid from a solution containing both containment medium and the liquid crystal composition. It can also be formed by making an initially homogeneous mixture containing both containment medium and liquid crystal composition at an elevated temperature, then cooling to phase-separate out liquid crystal volumes contained in the containment medium. Further, it can be formed by an in-situ polymerization process, in which the containment medium is polymerized and simultaneously encapsulates a liquid crystal composition. The liquid crystal composition need not be entirely surrounded by the polymer, and may exist as part of a system with co-continuous phases.

Typically, an encapsulated liquid crystal structure is substantially non-transparent in the absence of a sufficient electric field (the "field-off" state) and substantially transparent in the presence of a sufficient electric field (or "field-on" state). The electric field induces a change in the alignment of the liquid crystal molecules in the liquid crystal composition, in turn causing the encapsulated liquid crystal structure to switch from a highly light-scattering (and/or absorbent) state to a highly non-scattering and substantially transparent state. Generally, it is preferred that the liquid crystal composition have a positive dielectric anisotropy and that the ordinary index of refraction of the liquid crystal composition be matched with the index of refraction of the containment medium, while the extraordinary index of refraction is substantially mismatched therewith. The physical principles by which such encapsulated liquid crystal structures operate are described in further detail in the aforementioned references, particularly the patents to Fergason. In those portions of the encapsulated liquid crystal structure to which a sufficient electric field is applied, the transition from a non-transparent state to a transparent state occurs, while adjacent areas to which no electric field has been applied remain non-transparent.

Figure 2:
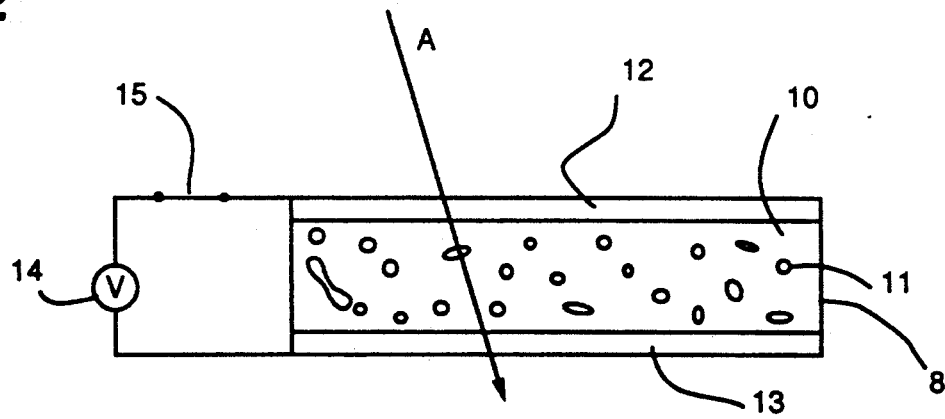

The principle of operation of an encapsulated liquid crystal structure is illustrated in FIGS. 1 and 2 (like numerals referring to like elements). Encapsulated liquid crystal structure 8 comprises a containment medium 10 having distributed therein plural volumes of liquid crystal composition 11 and is positioned between top and bottom electrodes 12 and 13, made for example of indium tin oxide ("ITO") or a thin metal coating. A voltage source 14 is connected to electrodes 12 and 13, but with switch 15 in the open position (FIG. 1), no voltage is applied across encapsulated liquid crystal material 12. Incident light (ray A) is scattered, both backward (rays a' and a'') and forward (b' and b''). When switch 15 is closed (FIG. 2), a voltage is applied across encapsulated liquid crystal material 8, causing molecules in liquid crystal composition 11 to align their long molecular axes with the field of the applied voltage. Owing to the match between the index of refraction of containment medium 10 and the ordinary index of refraction of liquid crystal composition 11, incident light (ray A) is not scattered, but is transmitted through encapsulated liquid crystal structure 8.

Pleochroic dyes have been mixed with liquid crystals to form a solution therewith. The molecules of pleochroic dyes generally align with the molecules of liquid crystals, so that the application of the electric field affects not only the predominant alignment of the liquid crystals, but also of the pleochroic dye. As the extent of the absorption of incident light by the pleochroic dye depends on its orientation relative to the incident light, the application of an external stimulus to a liquid crystal-pleochroic dye combination provides an mechanism for the controlled attenuation of light by absorption. (Thus, as used herein, the term "liquid crystal composition" also means, in context, a liquid crystal composition containing pleochroic dye dissolved therein.) Pleochroic dyes may be used in encapsulated liquid crystal structures to form colored displays. A display capable of displaying colored images can be formed by depositing side by side red, blue, and green pixels made from encapsulated liquid crystal structures of the corresponding color.

FIG. 3 shows an active matrix LCD according to this invention. A sandwich 40 comprises encapsulated liquid crystal structure 41 between a first support material 43 coated with a transparent ground plane electrode 42 (made for example of ITO) and a second support material 45 (typically glass) having thereon an array 44 of multiplexed non-linear TFT switching elements. Those skilled in the art will appreciate that other switching elements, such as varistors, diodes, and MIM's can also be used. The construction of the array is shown in greater detail in FIG. 3a, corresponding to a magnification of the portion of FIG. 3 labeled "A." Each pixel is defined across each electrode 46 (made for example of ITO). The application of a voltage across each electrode 46 is controlled by a switching element 47. In turn, each switching element 47 is addressed in multiplexed fashion via scan line 49 and data line 48.

The anisotropy of a liquid crystal composition extends to many of its physical properties. One of these properties is its dielectric constant ($\epsilon$), which has two principal values, one perpendicular ($\epsilon_\perp$) to the long molecular axis and one parallel ($\epsilon_\parallel$) to the long molecular axis. An average dielectric constant ($\epsilon_{avg}$) can be calculated, which is conventionally (see, e.g., Weber et al., cited supra) a weighted average according to the formula:

$$\epsilon_{avg} = \frac{2\epsilon_\perp + \epsilon_\parallel}{3}$$

We have unexpectedly discovered that for encapsulated liquid crystal structures for active matrix displays, $\epsilon_{avg}$ should be greater than 6 (at 1 kHz and 25° C.). It is especially preferred that $\epsilon_{avg}$ is between about 6 and about 10. Hitherto, the prior art has not recognized the importance of this parameter in encapsulated liquid crystal structures for active matrix displays, or has recommended a different, less advantageous value for $\epsilon_{avg}$. Dielectric constants and dielectric anisotropy may be measured for example by the method described by Finkenzeller et al. in the paper entitled "Physical Properties of Liquid Crystals: III. Dielectric Permittivities," in The Merck Group Liquid Crystal Newsletter, No. 4 (March 1989).

In one aspect of the invention, the liquid crystal composition should have a low cyano content, by which is meant that less than 1.8 meq/g cyano groups (preferably less than 0.5 meq/g). It is especially preferred that the liquid crystal composition be substantially free of cyano groups or consists essentially of compounds free of cyano groups.

As is common in the art, the liquid crystal composition generally does not consist of a single discrete compound, but is a mixture of different liquid crystal compounds. It is preferred that the liquid crystal composition comprises fluorinated liquid crystal compounds, such that the composition has a fluorine content greater than 2.0 meq/g, preferably between 2.0 and 10.0 meq/g.

Chlorinated liquid crystal compositions are also suitable.

Accordingly, in an especially preferred embodiment the liquid crystal composition is substantially free of cyano groups and has a fluorine content between 2.0 and 10.0 meq/g.

The liquid crystal composition preferably has a large optical anisotropy $\Delta n$, which is the difference between its ordinary and extraordinary indices of refraction. A large $\Delta n$ leads to a higher degree of scattering in the field-off state, resulting in a display with improved contrast. Since the ordinary refractive index of the liquid crystal material is substantially matched to the refractive index of the containment medium, a larger $\Delta n$ also means a larger difference between the latter and the extraordinary refractive index of the liquid crystal material. This latter difference affects the field-off scattering, with larger amounts of scattering being associated with larger differences. Preferably, $\Delta n$ is greater than 0.15, more preferably between 0.15 and 0.30. Optical anisotropy may be measured for example by the method described by Finkenzeller et al. entitled "Physical Properties of Liquid Crystals: IV. Optical Anisotropy," in The Merck Group Liquid Crystal Newsletter, No. 5 (October 1989).

The liquid crystal composition also preferably has a threshold voltage $V_{th}$ at 25° C. of less than 1.8 volt, more preferably between 0.8 volt. A lower $V_{th}$ corresponds to a display whose pixels can be driven at a lower voltage. By $V_{th}$ is meant the voltage at 20° C. at which the liquid crystal composition causes 90% absorption of incident light when used in a twisted nematic cell, for a measurement made at right angles to the cell. For more on $V_{th}$ and its measurement, see the "LIXON Information" brochure by Chisso Corporation, cited supra, the disclosure of which is incorporated herein by reference.

The practice of this invention may be further understood by reference to the following examples, which are provided by means of illustration, not limitation.

EXAMPLE 1

An encapsulated liquid crystal structure was made by an emulsion process using a 50:50 weight/weight mixture of liquid crystals ZLI-4792 and ZLI-3401, both from Merck (Darmstadt, Germany), with poly(vinyl alcohol) (Airvol 205, Air Products and Chemicals, King of Prussia, Pa., USA) as the containment medium.

Liquid crystal ZLI-4792 is cyano-free, while liquid crystal ZLI-3401 is a partially cyanated, with the result that the overall composition had a cyano content of 1.55 meq/g. The composition also had a fluorine content of 2.79 meq/g. The fluorine content was measured by elemental analysis, while the cyano content was measured by $^{13}C$ NMR. Accurately weighed samples of the liquid crystal composition and toluene (used as an internal intensity standard) were placed in a 10 mm NMR tube and dissolved in $CDCl_3$. A $^{13}C(^1H)$ gated decoupling experiment was performed on a Varian XL300 spectrometer with a recycle delay of 400 sec to ensure complete polarization of the $^{13}C$ nuclei between successive scans. The integrated peak intensity of the methyl group of the toluene (ca. 21 ppm relative to TMS) was used to calculate the number of equivalents of cyano groups present in the liquid crystal composition, based on the integrated intensity of the region between 118 and 119 ppm (assigned to cyano groups).

The voltage holding ratio of the encapsulated liquid crystal structure was measured as follows. A sample of encapsulated liquid crystal structure was mounted between two electrodes and short voltage pulse (30-300 μsec) was applied. The sample was placed in an open circuit, allowing the charge to decay through the sample for a given hold period (15 msec). A pulse of opposite polarity was then applied, simulating conditions to which the sample would be subjected during actual service in an active matrix LCD. The voltage holding ratio is expressed as the percentage of the originally applied voltage retained at the end of the hold period. Larger values are more desirable. The voltage of the test generally is the voltage at which the sample achieves 90% of its maximum transmission. This voltage will vary somewhat from sample to sample, and even within a sample, depending on its history. To evaluate the aging stability of an encapsulated liquid crystal structure, the voltage holding ratio was measured on the structure as made and on material after an aging cycle, such as 200 hours at 100° C.

The $E_{90}$, a thickness-corrected measure of the operating voltage, and the contrast ratio of the LCD were measured as follows: The test LCD cell is powered from 0 volt to above the saturation voltage in 25 equal increments (pausing 0.5 sec at each voltage). The transmission at 0 volt (% $T_{off}$) and at saturation (% $T_{on}$) are noted. Then the voltage $V_{90}$, at which $$\%T = 0.9(\%T_{on} - \%T_{off})$$

is also noted. $E_{90}$ is then calculated according to the formula $$E_{90} = V_{90}/d$$

where d is the thickness of the sample in microns (μ). The contrast ratio (CR) of the cell is given by the equation $$CR = \frac{\%T_{on}}{\%T_{off}}.$$

The voltage holding ratio, contrast ratio, and $E_{90}$ of subsequent samples were also measured as described.

EXAMPLE 2

An encapsulated liquid crystal structure was made following the procedure of Example 1, except that the liquid crystal was RY1005XX (Chisso Corporation, Tokyo, Japan). RY1005XX is believed to be a mixture containing liquid crystal compounds of the following structures:

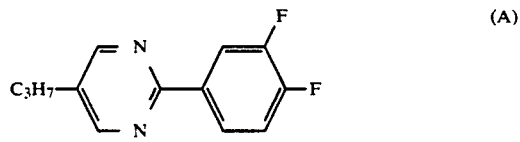

(A)

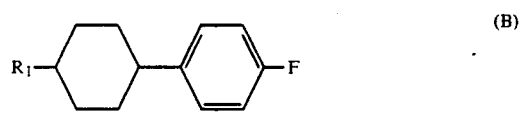

(B)

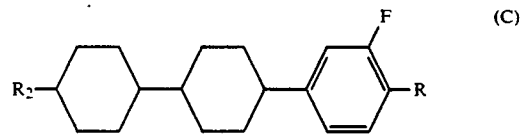

(C)

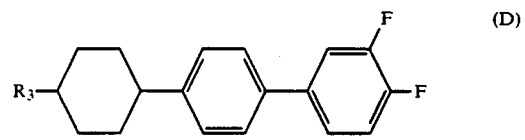

(D)

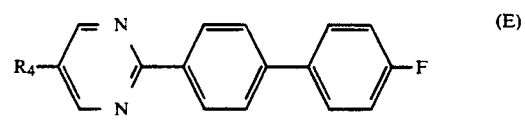

(E)

where $R_1$ is $C_3H_7$ or $C_5H_{11}$; $R_2$ is $C_2H_5$, $C_3H_7$, or $C_5H_{11}$; $R_3$ is $C_2H_5$, $C_3H_7$, or $C_5H_{11}$; and $R_4$ is $C_2H_5$, $C_3H_7$, $C_4H_9$, or $C_5H_{11}$. It was substantially free of cyano groups and had a fluorine content of 3.40 meq/g.

EXAMPLE 3

An encapsulated liquid crystal structure was made following the procedure of Example 1, except that the liquid crystal was RY1002XX (Chisso Corporation, Tokyo, Japan). RY1002XX is believed to be a mixture containing liquid crystal compounds (A), (D) ($R_3 = C_2H_5$, $C_3H_7$, or $C_5H_{11}$), (E) ($R_4 = C_3H_7$, $C_4H_9$, or $C_5H_{11}$) and additionally liquid crystal compounds of the following structures:

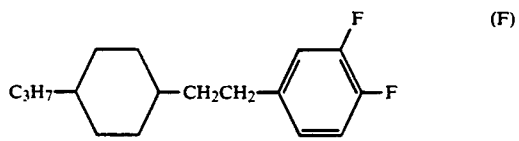

(F)

-continued

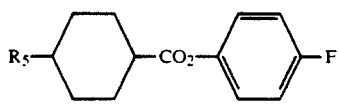
(G)

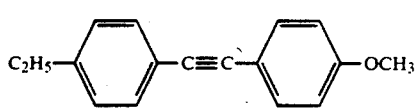
(H)

where $R_5$ is $C_5H_{11}$ or $C_7H_{15}$. It was substantially cyano-free and had a fluorine content of 3.85 meq/g.

EXAMPLE 4

An encapsulated liquid crystal structure was made following the procedure of Example 1, except that the liquid crystal was liquid crystal composition 18193, a chlorinated LC mixture from Merck (Darmstadt, Germany), believed to be cyano-free.

EXAMPLE 5

An encapsulated liquid crystal structure was made following the procedure of Example 1, except that the liquid crystal was a 50:50 mixture (weight:weight) of liquid crystal composition 18193 and ZLI-3401, both from Merck (Darmstadt, Germany), having a cyano content of 1.55 meq/g.

The following comparative examples A-C not according to this invention are provided for comparison against the improved properties obtained by using encapsulated liquid crystal structures according to our invention.

EXAMPLE A

An encapsulated liquid crystal structure was made following the procedure of Example 1, except that the liquid crystal was 18282 (British Drug House, Poole, England). 18282 is a liquid crystal composition having a high cyano content (3.95 meq/g) as wells as fluorine groups (0.60 meq/g).

EXAMPLE B

An encapsulated liquid crystal structure was made following the procedure of Example 1, except that the liquid crystal was LIXON 5047 (Chisso Corporation, Tokyo, Japan). LIXON 5047 is believed to be a fluorinated (5.63 meq/g), cyano-free liquid crystal composition.

EXAMPLE C

An encapsulated liquid crystal structure was made following the procedure of Example 1, except that the liquid crystal was PN001 (Rodic, Tokyo, Japan). PN001 is a liquid crystal composition consisting entirely of cyano-containing compounds (cyano content 4.35 meq/g).

The properties of encapsulated liquid crystal structures and displays made according to the preceding examples of the invention and the comparative examples are provided in Table I.

TABLE I
PROPERTIES OF ENCAPSULATED LIQUID CRYSTAL STRUCTURES

| Ex. | $\epsilon_{avg}$ | $V_{th}$ (volt) | $\Delta n$ | Voltage Holding Ratio (%) As made[a] | Aged[b] | Contrast Ratio[c] | $E_{90}$[d] (volt/ $\mu$) |
|---|---|---|---|---|---|---|---|
| 1 | 7.42 | 1.67 | 0.127 | 95 (19) | 70 | 6.0 | 2.59 |
| 2 | 7.33 | 1.61 | 0.175 | 96 (12) | 93 | 7.1 | 2.60 |
| 3 | 7.2 | 1.85 | 0.175 | 96 (30) | 95 | 12.6 | 3.63 |
| 4 | 7.87 | 1.95 | 0.188 | 98 (53) | 95 | 15.6[e] | 5.84 |
| 5 | 9.44 | 1.63 | 0.174 | 98 (31) | 47 | 8.5[f] | 2.72 |
| A | 11.97 | 1.35 | 0.244 | 90 (114) | 34[g] | 16.5 | 2.8 |
| B | 5.5 | 1.53 | 0.10 | 99 (31) | 94 | 3.5 | 3.78 |
| C | 19.87 | 1.15 | 0.254 | 29 (12) | — | 6.5 | 2.37 |

[a] At 25° C.; test voltage in parentheses.
[b] After aging for 200 hr at 100° C. except as noted; test voltage may differ slightly from that of "As made" samples.
[c] Based on 50 volt $V_t$ test except as noted.
[d] Based on 50 volt $V_t$ test except as noted.
[e] Based on 100 volt $V_t$ test.
[f] Based on 75 volt $V_t$ test.
[g] After aging for 100 hr at 100° C.

What is claimed is:

1. A liquid crystal display comprising (a) plural pixels comprising an encapsulated liquid crystal structure comprising a containment medium having dispersed therein a liquid crystal composition which (i) contains less than 1.8 meq/g cyano groups and (ii) has an average dielectric constant $\epsilon_{avg}$ greater than 6, and (b) a non-linear switching element connected in series with each pixel.

2. A liquid crystal display according to claim 1, wherein $\epsilon_{avg}$ is between about 6 and about 10.

3. A liquid crystal display according to claim 1, wherein the liquid crystal composition has an optical anisotropy $\Delta n$ greater than 0.15.

4. A liquid crystal display according to claim 1, wherein the liquid crystal composition has a threshold voltage $V_{th}$ less than 1.8 volt.

5. A liquid crystal display according to claim 1, wherein the non-linear switching element is a thin film transistor.

6. A liquid crystal display according to claim 1, wherein the liquid crystal composition is substantially free of cyano groups.

7. A liquid crystal display according to claim 1, wherein the liquid crystal composition is operationally nematic and has a positive dielectric anisotropy.

8. A liquid crystal display according to claim 1, wherein the liquid crystal composition further comprises a pleochroic dye.

9. A liquid crystal display according to claim 1, wherein the liquid crystal composition contains more than 2.0 meq/g fluorine.

10. A liquid crystal display comprising (a) plural pixels comprising an encapsulated liquid crystal structure comprising a containment medium having dispersed therein a liquid crystal composition which has (i) a threshold voltage $V_{th}$ less than 1.8 volt, (ii) an optical anisotropy $\Delta n$ greater than 0.15, and (iii) an average dielectric constant $\epsilon_{avg}$ between about 6 and about 10, and (b) a non-linear switching element connected in series with each pixel.

11. A liquid crystal display according to claim 10, wherein the liquid crystal composition contains less than 1.8 meq/g cyano groups.

12. A liquid crystal display according to claim 10, wherein the liquid crystal composition is substantially free of cyano groups.

13. A liquid crystal display according to claim 10, wherein the non-linear switching element is a thin film transistor.

14. A liquid crystal display according to claim 10, wherein the liquid crystal composition is operationally nematic.

15. A liquid crystal display according to claim 10, wherein the liquid crystal composition further comprises a pleochroic dye.

16. A liquid crystal display according to claim 10, wherein the liquid crystal composition contains more than 2.0 meq/g fluorine.

17. An encapsulated liquid crystal structure comprising a containment medium having dispersed therein a liquid crystal composition which (i) contains less than 1.8 meq/g cyano groups and (ii) has an average dielectric constant $\epsilon_{avg}$ greater than 6.

18. An encapsulated liquid crystal structure according to claim 17, wherein $\epsilon_{avg}$ is between about 6 and about 10.

19. An encapsulated liquid crystal structure according to claim 17, wherein the liquid crystal composition has an optical anisotropy $\Delta n$ greater than 0.15.

20. An encapsulated liquid crystal structure according to claim 17, wherein the liquid crystal composition has a threshold voltage $V_{th}$ less than 1.8 volt.

21. An encapsulated liquid crystal structure according to claim 17, wherein the liquid crystal composition is substantially free of cyano groups.

22. An encapsulated liquid crystal structure according to claim 17, wherein the liquid crystal composition is operationally nematic and has a positive dielectric anisotropy.

23. An encapsulated liquid crystal structure according to claim 17, wherein the liquid crystal composition further comprises a pleochroic dye.

24. An encapsulated liquid crystal display according to claim 17, wherein the liquid crystal composition contains more than 2.0 meq/g fluorine.

25. An encapsulated liquid crystal structure comprising a containment medium having dispersed therein a liquid crystal composition which has (i) a threshold voltage $V_{th}$ less than 1.8 volt, (ii) an optical anisotropy $\Delta n$ greater than 0.15, and (iii) an average dielectric constant $\epsilon_{avg}$ between about 6 and about 10.

26. An encapsulated liquid crystal structure according to claim 25, wherein the liquid crystal composition contains less than 1.8 meq/g cyano groups.

27. An encapsulated liquid crystal structure according to claim 25, wherein the liquid crystal composition is substantially free of cyano groups.

28. An encapsulated liquid crystal structure according to claim 25, wherein the liquid crystal composition is operationally nematic.

29. An encapsulated liquid crystal structure according to claim 25, wherein the liquid crystal composition further comprises a pleochroic dye.

30. An encapsulated liquid crystal display according to claim 25, wherein the liquid crystal composition contains more than 2.0 meq/g fluorine.

* * * * *

UNITED STATES PATENT AND TRADEMARK OFFICE
CERTIFICATE OF CORRECTION

PATENT NO. : 5,233,445

INVENTOR(S) : Kamath et al.

DATED : August 3, 1993

It is certified that error appears in the above-identified patent and that said Letters Patent is hereby corrected as shown below:

Cover Page [56] references cited, Foreign Patent Documents, line 7 replace "4/1992" by --4/1991--.
Cover Page [56] references cited, Other Publications, line 13 replace "Aristrophy" by --Anistropy--.
Cover Page [56] References Cited, Other Publications, line 20 replace "584-597" by --594-597--.
Column 5, line 24 replace "an" by --a--.
Column 5, line 62 replace "E avg=$\frac{2\epsilon\perp+\epsilon}{3}$" by --E avg =$\frac{2\epsilon\perp+\epsilon 11}{3}$--

Signed and Sealed this

First Day of November, 1994

Attest:

BRUCE LEHMAN

Attesting Officer     Commissioner of Patents and Trademarks